United States Patent [19]

Obrecht

[11] Patent Number: 4,597,289

[45] Date of Patent: Jul. 1, 1986

[54] DEVICE FOR MEASURING STRESSES TRANSMITTED BY A SHAFT, IN PARTICULAR TO A DRILL BIT

[75] Inventor: Georges Obrecht, Seyssins, France

[73] Assignee: Alsthom-Atlantique, Paris, France

[21] Appl. No.: 749,247

[22] Filed: Jun. 27, 1985

[30] Foreign Application Priority Data

Jun. 27, 1984 [FR] France .................................. 84 10138

[51] Int. Cl.<sup>4</sup> ............................................. E21B 47/00
[52] U.S. Cl. .................... 73/151; 73/862.19; 175/40
[58] Field of Search ............... 73/151, 862.19, 862.32, 73/862.33, 862.35; 175/39, 40, 320

[56] References Cited

U.S. PATENT DOCUMENTS

| 3,672,213 | 6/1972 | Watson | 73/862.35 |
| 3,686,942 | 8/1972 | Chatard et al. | 73/151 |
| 3,827,294 | 9/1974 | Anderson | 73/151 |
| 3,864,968 | 2/1975 | Anderson | 73/151 |
| 3,968,473 | 7/1976 | Patton et al. | 175/40 |
| 4,294,318 | 10/1981 | Desbrandes et al. | 73/151 |
| 4,359,898 | 11/1982 | Tanguy et al. | 73/151 |
| 4,527,335 | 7/1985 | Meline | 73/781 |

Primary Examiner—Stewart J. Levy
Assistant Examiner—Robert R. Raevis
Attorney, Agent, or Firm—Sughrue, Mion, Zinn Macpeak & Seas

[57] ABSTRACT

The device for measuring stresses applied to a drilling tool comprises a removable instrument socket (2) secured by means of protuberances (15, 16) thereon to the wall of a compartment formed thereby in a shaft (OM) such as to make fast said socket and said shaft in two transverse planes (12, 13) and as to transmit to said socket the strains occurring in the shaft in response to the stresses to be measured. Strain gauges (9) are fitted to the socket to measure said strains, and accordingly said stresses.

10 Claims, 8 Drawing Figures

FIG.1
FIG.2
FIG.3
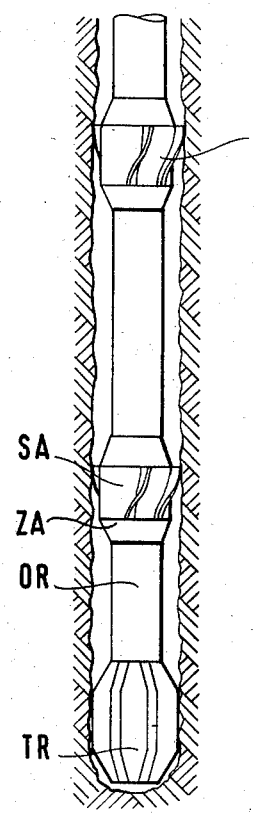
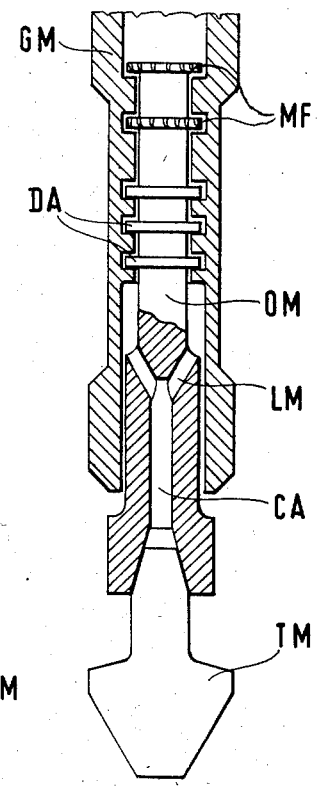
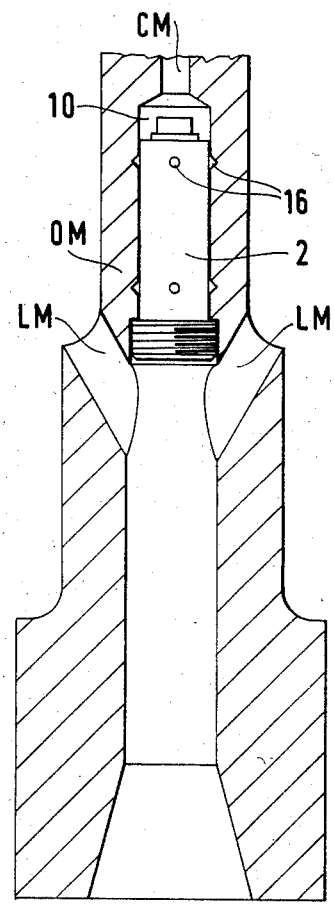

DEVICE FOR MEASURING STRESSES TRANSMITTED BY A SHAFT, IN PARTICULAR TO A DRILL BIT

FIELD OF THE INVENTION

This invention concerns a device for measuring stresses transmitted by a shaft and especially those stresses being transmitted to a drill bit in a drill string.

BACKGROUND OF THE INVENTION

There are basically two methods of drilling now in use.

The first method, termed rotary drilling, is illustrated by FIG. 1. A drilling tool or bit TR driven by a tubular shaft or drill pipe OR equipped, from the bit upwards, with first and second stabilizers SA and SB. The shaft is rotatively driven from ground level. Drilling mud descends through the shaft to the bit and goes back up around the shaft.

The second method, termed downhole motor drilling, is illustrated by FIG. 2. The bit TM is driven by a shaft OM, which is itself driven by a downhole motor MF—usually a turbine—and operated by the drilling mud descending under pressure through an axial channel in a drill stem GM. The shaft is held in relation to the stem by means of a certain number of friction bearing disks DA. The drilling mud penetrates into an axial channel CA of the shaft below the disks and motor through special openings LM.

Regardless of the drilling method used, the values of real stresses exerted on the drilling tool down in the hole (the torque, the weight and the lateral stresses on the tool) are only very approximately known on the rig floor in the absence of downhole measurements. Indeed, the torque applied to the drill stem at the surface by the rotary table arrives at the tool diminished by all the losses due to the friction arising between the rods and stabilizers and the walls of the well, all of which losses are highly variable and difficult to evaluate. For the same reasons, knowledge of the total weight on the tool affords a roughly worthwhile indication of the actual axial thrust received by the tool only for near-vertical holes, and the lateral stress on the tool as well as the rod bending stresses are a complete mystery.

Given the conditions surrounding operation of the downhole parts and their shapes and dimensions, it is moreover difficult to envisage placing strain gauges on such shafts, either by bonding or deposition as taught by the latest techniques. Yet such strain gauges are known to be well suited to the measurement of the stresses under consideration.

SUMMARY OF THE INVENTION

The present invention is directed to a measuring device for obtaining exact knowledge of these effective stresses which device manufacture, installation and maintenance whereof are easily effected even when the measurement must be made in such unfavorable conditions as obtain at the bottom of a drill hole.

Specifically, the invention is a measuring device for measuring the stresses transmitted by a shaft or drill pipe, in particular to a drilling tool, said device comprising:

at least one measuring sensor mounted in a shaft length of known stiffness to supply an output signal representative of the elastic deformation of said length in response to said stresses which it transmits, such that said output signal serves as a measurement signal of said stresses, the main improvement of said device being that said sensor is carried in a removable instrument socket, arranged coaxially in a compartment formed in said measurement length of shaft, said socket being drawn out and its main axis being longitudinal, and being elastically deformable and fitted with a plurality of anchoring means with external faces adapted to anchor themselves in the wall of said compartment, each of said anchoring means being radially mobile between a retracted position where it does not project from the outer surface of said socket, to enable the removal thereof, and a thrust out position where it does project from said surface, to anchor itself in said wall, said anchoring means being angularly distributed in two anchoring planes perpendicular to said main axis so that the socket and the shaft interlock in both of said planes when said anchoring means are thrust out or positively engaged, the length of said socket between said two planes constituting a measurement area wherein said sensor is attached, and reversible manouvering means for working said anchoring means to lock or unlock said socket after it has been placed in said compartment.

At least one sensor is attached to the socket in said measurement area to supply an output signal reflecting the deformations affecting said socket, such that the signal serves as the stress measurement signal when said anchoring means have been thrust out into positive engagement or locking position.

Moreover, the device according to the invention can be given further improvements as follows:

The said manouvering or control means comprise a plunger operable to slide longitudinally between a position anchoring said socket and a position where said socket is slidable, said plunger having a plurality of control inclines respectively cooperating, at least indirectly, with said socket anchoring means such that the longitudinal displacement of said plunger from its sliding position to its catching position radially thrusts out each of said anchoring means into positive engagement with said shaft wall.

Said device comprises an oblong sheath having a fastening area equipped with means for coaxially attaching it in a removable manner within said compartment in the shaft, part of the length of said sheath lacking said fastening area being coaxially arranged within said measuring socket with some play, said socket itself having a fastening area, outside its measurement area, by which it is attached to said sheath so as to be able to elastically deform without deforming said sheath, said socket or said sheath being provided with elastic means for pulling back said catching means to set the latter in their retracted position when the plunger is in sliding position, said sheath being transpersed by radially extending guiding channels and being equipped with transmission parts operable to move radially within said channels in front of inside faces of said anchoring means, such that, as the said plunger moves to its anchoring position, said manouvering or control inclines first thrust out said transmission parts then thrust out said anchoring means into positive engagement position.

Said transmission parts can consist of balls, in which case, behind said inclines on said plunger (ie. following said plunger in its direction of motion), there are cylindrical bearing surfaces bearing a coaxial relation with said socket which make contact with said balls when the plunger reaches its anchoring position, said anchoring means also having on their inside faces similar coaxial cylindrical bearing surfaces in contact with said balls, and said guide holes having a larger diameter than said balls, such that when the plunger is in anchoring position said anchoring means are able to move slightly relative to the plunger thanks to the balls rolling between bearing surfaces on the plunger and the anchoring means.

Said elastic pull-back means of the anchoring means of the socket consist of tabs, each carrying one anchoring means and each extending lengthwise in one direction of the surface of said socket, extending widthwise in another direction of same said surface, perpendicular to said lengthwise dimension, and having a radial thickness less than said length and said width. At least one longitudinal end of each tab is attached to the socket away from said anchoring means, making the tab flexible lengthwise and rigidly operable to block the movements of said anchoring means relative to the socket in parallel relation to the surface of said socket.

The long side of the tab may be arranged parallel to the axis of the socket, if the main stresses applied are parallel to said axis. Or, if the directions of the loads were mainly circumferential, the long sides of the tabs would also be circumferentially disposed.

Said sheath has an enlarged, hollow back end, which is provided with an outside thread for the purpose of screwing it into the shaft compartment and an inside thread to receive a control screw operable to push and pull said plunger.

An extension of said control screw is made longitudinally fast with the plunger by a radial pin and circumferential groove combination and angular movement of the plunger relative to the sheath is prevented by a radial pin and longitudinal groove combination.

Said plunger and said control screw are both given an annular shape to allow axial passage of a fluid such as a drilling mud wetting a tool on the end of said shaft.

Said anchoring means have anchoring points on their outside faces.

The instrument socket at least is made of steel. But more often the measuring device as a whole is made of steel, as are the devices which will be described hereinafter by way of example.

The socket's stiffness is selected to be less than 1% of the stiffness of the measurement lengths of shaft so that the stresses exerted upon said anchoring means are low.

It is another object of the invention to provide a method of measuring the stresses exerted on a drilling tool in operation, by a transmission shaft having a long axis, said method consisting in inserting a device according to the invention coaxially into a cylindrical compartment coaxially formed in a section of said shaft, between the drilling tool or bit and the nearest area (ZA) where another stress is likely to be applied to said shaft.

In accordance with the invention, a separate and removable measuring device is inserted into the part strained by the stresses to be measured, namely in the above-mentioned section fo the shaft, to supply the desired stress information. Moreover, two rigid, independent portions of the device are made fast with two separate portions of the stressed part such that the relative displacements of said two device portions when stressed provide an indication of the relative movements of the separate portions of the part, said movements being directly proportional to the stresses and thus indicating the amount of strain.

Several preferred embodiments of the invention will now be described with reference to the appended drawings. It should be understood that the elements specifically shown and described could be replaced by other elements serving the same technical functions without departing from the scope and spirit of the invention.

In the drawings, like items appearing in different figures are given the same references throughout.

BRIEF DESCRIPTION OF THE DRAWINGS

FIG. 1 is an axial sectional view of the bottom part of a rotary-type drill string or column.

FIG. 2 is an axial sectional view of the bottom part of a downhole-motor type drilling string.

FIG. 3 is an axial sectional view of an enlarged detail of the string bottom shown in FIG. 2, following the provision of a compartment therein and insertion in the latter of a measuring device according to a first embodiment of the invention.

DESCRIPTION OF PREFERRED EMBODIMENTS

Figure 4:
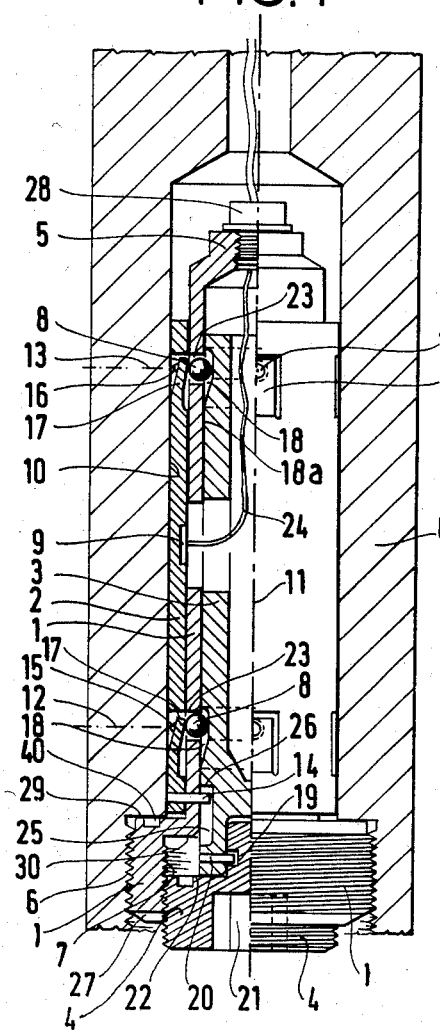
FIGS. 4 and 5 are enlarged partial axial sectional views and partial elevations, in the left and right halves respectively of both figures, of the measuring device of FIG. 3, with the socket anchoring means retracted in FIG. 4 and thrust out in FIG. 5 and the shaft shown in axial section in both figures.

In these figures, the axis (11, 68) of the sockets of the measuring devices according to the invention is shown vertically and said devices are inserted from the bottom, into the corresponding compartments such that the previously mentioned front and back ends or forward and behind directions become the top and bottom ends, respectively, in the drawings.

As shown in FIG. 3, a center bore or axial channel CM has been made in the shaft OM of the downhole motor drill illustrated in FIG. 2 for passage of an electrical transmission cable usd to transmit the measurements according to the invention. The bottom end of said channel is enlarged to form an axial compartment 10 upstream from the place where the motive fluid passes from the outside to the inside of the shaft OM, through openings LM therein, to reach the tool.

Figure 5:
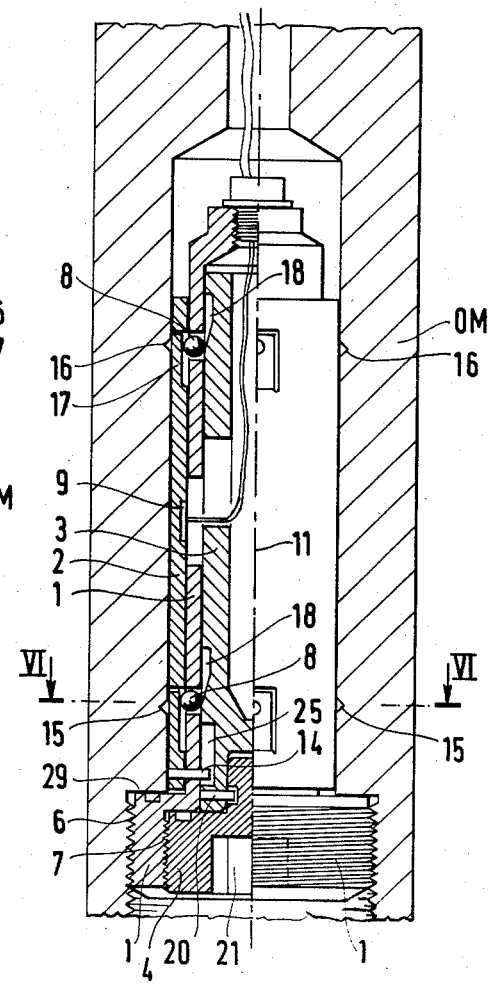
Figure 6:
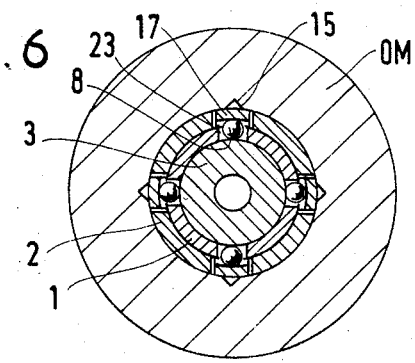
FIG. 6 is a cross section of the device shown in FIG. 5, taken along line VI—VI of that figure.

Said compartment is calibrated to accept the measuring device of FIGS. 4, 5 and 6, which forms a fluid-tight housing. The latter comprises the following basic components:

a sheath 1 which screws into the shaft compartment 10,
a socket 2 loosely fitted around sheath 1,
a plunger 3 slidably mounted in sheath 1, and a screw plug 4 which pushes up plunger 3 as it is screwed into sheath 1.

Sheath 1 has a cylindrical midsection and tapers in at the top to form a neck 5 adapted to receive a connector. The other end of the sheath tapers out and is given an outside thread 6 and an inside thread 7. The cylindrical midsection has drilled cylindrical guide channels 23 having a radial axis. In said channels 23, transmission parts—in this case, balls 8—are arranged. Said channels are located in two mutually parallel anchoring planes 12 and 13 which are perpendicular to device axis 11.

Socket 2 carries several strain gauges such as 9 on its inside wall providing full intelligence about the mutual displacement of two rigid circular sections of the socket, namely those sections defined by planes 12 and 13. The socket is connected to sheath 1 by means of a single-point fastener 14 consisting of a radial pin on the outside of a measurement section extending longitudinally from plane 12 to plane 13. It is provided, in the same said planes 12, 13 where the balls are located, with protuberances 15 and 16 shaped as cones or diamond points. These protuberances themselves constitute the anchoring means. They are carried by tabs 17 which are elastic and flexible in the radial direction but rigid in the directions of the plane which is tangent at this point to the cylinder surrounding the socket.

Plunger 3 is given two circular notches 18 in its outside surface, which are coaxial with shaft 11. The shape of said notches is made up of a quarter torus at the top, a truncated cylinder in the middle and an acute truncated cone toward the bottom, to form a driving or control incline merging at the bottom with the regular cylindrical surface 18a of the plunger, which latter surface forms a bearing surface for said balls 8 near said incline.

The plug 4 serving as a control screw is given either a square or a hexagonal drive socket 21. Plug 4 screws into the inside thread 7 of sheath 1 and is provided with a circular slot 19 engageable by a pin 20 on plunger 3. As the plug 4 is driven in by means of its drive socket 21, the inward driving motion is transmitted to plunger 3 via plug shoulder 22. At this time, the balls 8 in sheath 1 channels 23, initially located in the notches 18, are gradually pushed out by the truncated cone incline in said notches and come to radially press against the tabs 17 right behind protuberances 15 and 16. The latter's very fine points dig into the shaft OM and rigidly fix, in planes 12 and 13, the sections of said shaft to the sections of socket 2 which carries the strain gauges. When stresses are exerted on the shaft, these sections move (in or out in response to axial stresses, obliquely in response to bending stresses, and rotationally about the shaft axis in response to twisting stresses). The instrument socket 2 is provided with grooves arranged so that the movements or strains in sections 12 and 13 bring about only very limited strains in anchors 15 and 16 and so that virtually all of said movement is transmitted to the area supporting the measuring gauges 9. The strain gauge leads 24 are taken back to a common commercial connector 28 in part 5 of sheath 1 for connection to the above-mentioned signal cable, which has not been specifically identified in the drawings. The screwbase of socket 1 is provided with a groove 40 containing an O-ring seal not shown.

Installation of the device in the shaft OM is easily carried out according to the following procedure.

After fitting connector 28, the device is arranged in its configuration as per FIG. 4, with plug 4 unscrewed. It is then screwed into compartment 10 thanks to threads 6 until it abuts with the sealed shoulder 29 on shaft OM. The next step simply consists in screwing in plug 4 as previously described until its shoulder 22 comes against the bottom 30 of the hole in sheath 1. The device is then operational.

Removing the device is as easy as its installation. Plug 4 must first be unscrewed to the point where the end 26 of slot 25 of plunger 3 makes contact with the pin 14 on sheath 1. Balls 8 resume their initial positions in notches 18, thus allowing the flexible tabs 17 to release protuberances 15 and 16 from their anchored positions in shaft OM.

The device can then be removed simply by unscrewing sheath 1 using notches 27 provided therefor in its base.

The device specified in the foregoing can easily fit in a diameter of 35 to 40 mm. However, it can also be adapted for large diameter drill pipes. Instrument sockets some 10 to 20 mm thick can be used with very large diameters on the order for example of 100 to 400 mm.

Figure 7:
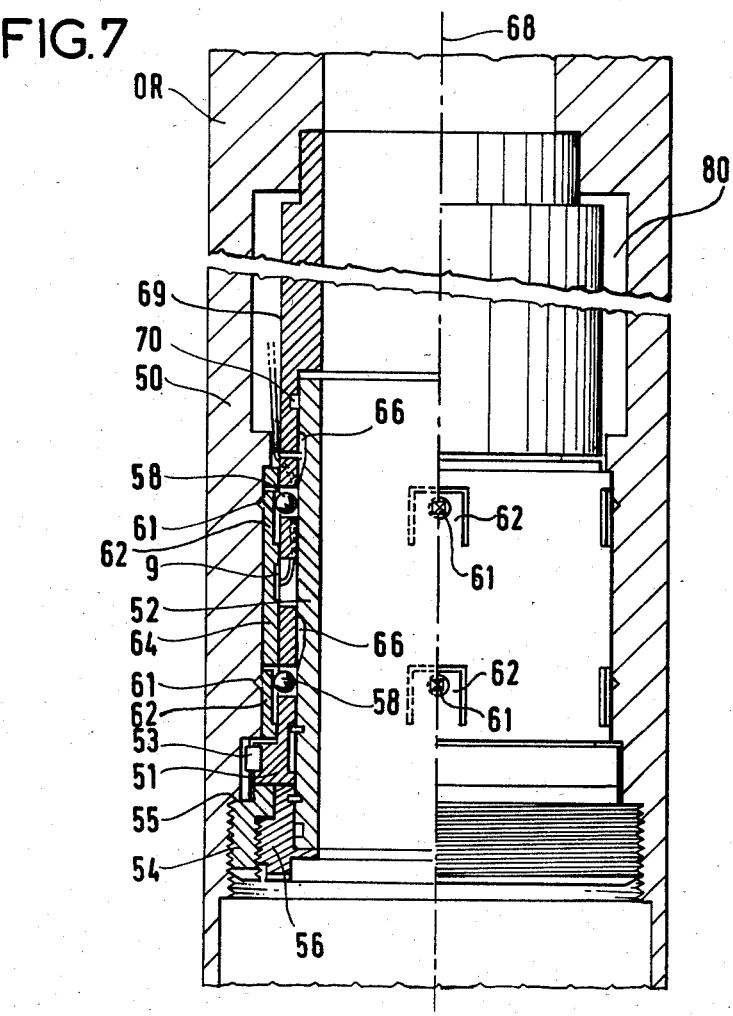
FIG. 7, in its left half, gives a half axial sectional view of a second embodiment of the stress measuring device according to the invention after its installation in the axial channel of the shaft of a drilling column like that of FIG. 1, and in its right half gives an elevation of the same device. The shaft is shown in axial section taken along a plane parallel to the figure plane.

The device used in the case for example of the rotary drill of FIG. 1 can be the same as the first, or can be made according to FIG. 7.

In the latter case, the sheath 51 is axially inserted into a body 50 being part of the shaft OR. A keyway 53 is used to angularly locate the sheath 51 in body 50. Nut 54 is then screwed home against shoulder 55, after which screw 56 can be driven into nut 54, axially driving a plunger consisting of a sliding socket 52. Said latter socket has two functions: anchoring the protuberances 61 (on flexible, elastic tabs 62) in body 50 by pressing against bulbs 58, and sealing off the device from its surroundings. The measurement area is shown under the reference 64, the control inclines under reference 66, and the overall axis under reference 68. Shaft OR is given an inside skirt 69 having a groove 70 for a sealing ring bearing against sliding socket 52. Said skirt 69 protectively closes off a compartment 80 housing the electronics associated with the strain gauge 9.

Figure 8:
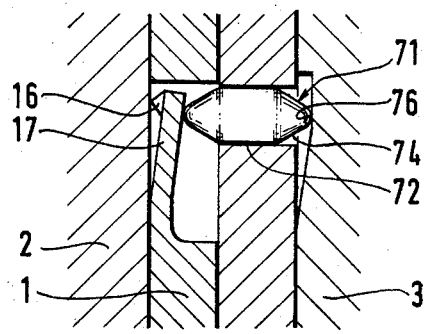
FIG. 8 is an enlarged, partial axial sectional view of a third embodiment of the invention, showing an alternative design for the stress transmission part, with the socket anchoring means in retracted position.

In the device represented in FIG. 8, said transmission parts 71 radially mobile in guiding channels 23 of sheath 1 are elongated in the device's radial direction and are given along part of their lengths either cylindrical or prism-shaped guiding surfaces 72 to cooperate with said guiding channels in preventing any swivelling of said parts about axes parallel to the circumferential direction of the device, such that said parts exert only a radial force on the inside faces of said anchoring means 16 of the instrument socket 2.

What is claimed is:

1. A measuring device for measuring the stresses transmitted by a shaft or drill pipe, in particular to a drilling tool, said device comprising, in combination, a measurement length of shaft of known stiffness, at least one measuring sensor mounted in said shaft length of known stiffness to supply an output signal representative of the elastic deformation of said length in response to said stresses which it transmits, such that said output signal serves as a measurement signal of said stresses, the improvement wherein said measurement length of shaft includes a compartment, said sensor is carried in a removable instrument socket, arranged coaxially in said compartment formed in said measurement length of shaft, said socket being drawn out and having a longitudinal axis, and including elastically deformable means fitted with a plurality of anchoring means with radially external faces for anchoring themselves in the wall of said compartment, each of said anchoring means being radially mobile between a retracted position where it does not project from the outer surface of said socket, to enable the removal thereof, and a radially thrust out position where it does project from said surface, to anchor itself in said wall, said anchoring means being angularly distributed in two anchoring planes perpendicular to said longitudinal axis so that the socket and the shaft interlock in both of said planes when said anchoring means are thrust out or positively engaged, the length of said socket between said two planes constituting a measurement area, said sensor being attached within said measurement area, and reversible control means for working said anchoring means to lock or unlock said socket after it has been placed in said compartment, and wherein said socket is slidable, and said control means comprise a plunger operable to slide longitudinally between a first position locking said socket to said side wall and a second position where said socket is slidable relative to said wall, said plunger having a plurality of control inclines respectively operatively engageable, at least indirectly, with said socket anchoring means such that the longitudinal displacement of said plunger from its sliding position to its locking position radially thrusts out each of said anchoring means into positive engagement with said shaft wall.

2. Device according to claim 1, further comprising an oblong sheath having a fastening area equipped with means for coaxially attaching it in a removable manner within said compartment in the shaft, part of the length of said sheath lacking said fastening area being concentrically arranged within said measuring socket with some play, said plunger being concentrically arranged within said sheath, said socket itself having a fastening area, outside its measurement area, by which it is attached to said sheath so as to be able to elastically deform without deforming said sheath, said socket elastic deforming means pulling radially inwardly said anchoring means to set the latter in their retracted position when the socket is in sliding position, said sheath being transpierced by radially extending guiding channels and being equipped with transmission parts operable to move radially within said channels towards and away from said anchoring means, such that, as said plunger moves to its anchoring position, said control means inclines thrust out radially said transmission parts which transmission parts then thrust out said anchoring means into positive engagement position.

3. Device according to claim 2, wherein said transmission parts consist of balls and wherein longitudinally adjacent said inclines on said plunger and following said plunger in its direction of motion, cylindrical bearing surfaces are provided on said plunger bearing a coaxial relation with said socket which make contact with said balls when the plunger reaches anchoring position, said anchoring means also include similar coaxial cylindrical bearing surfaces in contact with said balls, and guide holes being of a larger diameter than said balls, such that when the plunger is in anchoring position said anchoring means move slightly relative to the plunger due to the balls rolling between opposed bearing surfaces on the plunger and the anchoring means.

4. Device according to claim 2, wherein said elastic deforming means of the socket consist of tabs, each tab carrying one anchoring means and each tab extending lengthwise in one direction of the surface of said socket, extending widthwise in another direction of same said surface, perpendicular to said lengthwise dimension, and having a radial thickness less than said length and said switch, at least one longitudinal end of each tab being attached to the socket away from said anchoring means, making the tab flexible lengthwise and rigidly operable to block the movements of said anchoring means relative to the socket in parallel relation to the surface of said socket.

5. Device according to claim 2, wherein said sheath has an enlarged, hollow end, provided with an outside thread screwed into the shaft compartment and an inside thread, and a screw thread threadably received by said sheath on said inside thread and being operable to push and pull said plunger.

6. Device according to claim 5, wherein an extension of said control screw is longitudinally fixed with said plunger by a first radial pin on said plunger received within a circumferential groove within said control screw extension and angular movement of said plunger relative to said sheath is prevented by a second radial pin on said sheath received within a longitudinal groove within said plunger.

7. Device according to claim 5, wherein said plunger and said control screw are both of annular shape to allow axial passage of a fluid such as a drilling mud for wetting a tool on the end of said shaft.

8. Device according to claim 2, wherein said transmission parts adapted to move radially along said guiding channels of the sheath are elongated in the radial direction of the device and have along part of their lengths prism-shaped guiding surfaces for engagement with said guiding channels to prevent any swivelling of said parts about axes parallel to the circumferential direction of the device, such that said parts exert only a radial force on the inside faces of said anchoring means of the instrument socket.

9. Device according to claim 2, wherein said transmission parts adapted to move radially along said guiding channels of the sheath are elongated in the radial direction of the device and have along part of their lengths cylindrical guiding surfaces for engagement with said guiding channels to prevent any swivelling of said parts about axes parallel to the circumferential direction of the device, such that said parts exert only a radial force on the inside faces of said anchoring means of the instrument socket.

10. Device according to claim 1, wherein said anchoring means have anchoring points on their outside faces.

* * * * *